(12) United States Patent
Namuduri et al.

(10) Patent No.: US 12,036,886 B2
(45) Date of Patent: Jul. 16, 2024

(54) CONTROLLING A DC-DC CONVERTER FOR DC CHARGING

(71) Applicant: GM Global Technology Operations LLC, Detroit, MI (US)

(72) Inventors: Chandra S. Namuduri, Troy, MI (US); Lei Hao, Troy, MI (US); Samantha Gunter Miller, Berkley, MI (US); Chengwu Duan, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 409 days.

(21) Appl. No.: 17/469,463

(22) Filed: Sep. 8, 2021

(65) Prior Publication Data

US 2023/0074825 A1    Mar. 9, 2023

(51) Int. Cl.
*B60L 53/62* (2019.01)
*B60L 53/20* (2019.01)
*H02J 7/00* (2006.01)
*H02M 3/158* (2006.01)
*B60L 53/16* (2019.01)

(52) U.S. Cl.
CPC ............... *B60L 53/62* (2019.02); *B60L 53/20* (2019.02); *H02J 7/007* (2013.01); *H02M 3/158* (2013.01); *B60L 53/16* (2019.02); *B60L 2210/10* (2013.01); *H02J 2207/20* (2020.01)

(58) Field of Classification Search
CPC ........ H02M 3/158; B60L 53/16; B60L 53/18; B60L 53/20; B60L 53/62; B60L 2210/10; H02J 7/007; H02J 2207/20
USPC .................................. 320/104, 109, 140, 163
See application file for complete search history.

(56) References Cited

U.S. PATENT DOCUMENTS

| | | | |
|---|---|---|---|
| 10,189,357 B2* | 1/2019 | Zou .......................... | B60L 53/20 |
| 2014/0021916 A1* | 1/2014 | Bilezikjian ............... | B60L 3/04 320/109 |
| 2019/0255953 A1* | 8/2019 | Conlon .................... | B60L 58/12 |
| 2020/0321797 A1* | 10/2020 | Gerrits .................... | B60L 53/52 |
| 2023/0226933 A1* | 7/2023 | Liu ........................ | H02J 7/0024 320/127 |

* cited by examiner

*Primary Examiner* — Edward Tso
*Assistant Examiner* — Aaron Piggush
(74) *Attorney, Agent, or Firm* — Vivacqua Crane, PLLC

(57) ABSTRACT

An electrical system can include a rechargeable energy storage system (RESS) and a direct current to direct current (DC-DC) converter. The DC-DC converter is connected to the RESS and configured to connect to a DC charging station. The DC-DC converter is configured to selectively connect the RESS to the DC charging station such that a charging current is selectively provided to the RESS during a recharging operation.

20 Claims, 4 Drawing Sheets

CONTROLLING A DC-DC CONVERTER FOR DC CHARGING

INTRODUCTION

The present disclosure relates to relates to an electrical system that enables battery charging from a direct current (DC) charging device that functions as a current source via a DC-DC converter.

Direct current to direct current (DC-DC) converters convert a source of direct current (DC) from one voltage level to another voltage level. For example, switched mode DC-DC converters can convert one DC voltage level to another by temporarily storing input energy and then releasing the stored energy to the output at a different voltage.

SUMMARY

An example electrical system that increases a voltage supplied by a DC charging station is disclosed. The electrical system can include a rechargeable energy storage system (RESS) and a direct current to direct current (DC-DC) converter. The DC-DC converter is connected to the RESS and configured to connect to a DC charging station. The DC-DC converter is configured to selectively connect the RESS to the DC charging station such that a charging current is selectively provided to the RESS during a recharging operation.

In other features, the DC-DC converter comprises a first switch and a second switch.

In other features, the first switch and the second switch comprise a voltage-controlled semiconductor switch.

In other features, the voltage-controlled semiconductor switch comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (WBG) device, or an ultra-wideband-gap device (UWBG).

In other features, the first switch and the second switch are configured to operate in complementary states of operation.

In other features, the electrical system includes a controller operatively connected to the DC-DC converter and is configured to operate the DC-DC converter to selectively connect the RESS to the DC charging station based on a gate signal provided to at least one of the first switch or the second switch.

In other features, the controller is further configured to compare an input DC-DC converter voltage to a predetermined voltage threshold, and selectively operate the first switch to ramp up a voltage stored by a pre-charge capacitor, wherein the pre-charge capacitor is charged using power provided by the RESS.

An example electrical system that increases a voltage supplied by a DC charging station is disclosed. The electrical system can include a rechargeable energy storage system (RESS) and a direct current to direct current (DC-DC) converter. The DC-DC converter is connected to the RESS and configured to connect to a DC charging station. The DC-DC converter is configured to selectively connect the RESS to the DC charging station such that a charging current is selectively provided to the RESS during a recharging operation.

In other features, the DC-DC converter comprises a first switch and a second switch.

In other features, the first switch and the second switch comprise a voltage-controlled semiconductor switch.

In other features, the voltage-controlled semiconductor switch comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (WBG) device, or an ultra-wideband-gap device (UWBG).

In other features, the first switch and the second switch are configured to operate in complementary states of operation.

In other features, the electrical system includes a controller operatively connected to the DC-DC converter and is configured to operate the DC-DC converter to selectively connect the RESS to the DC charging station based on a gate signal provided to at least one of the first switch or the second switch.

In other features, the controller is further configured to compare an input DC-DC converter voltage to a predetermined voltage threshold, and selectively operate the first switch to ramp up a voltage stored by a pre-charge capacitor, wherein the pre-charge capacitor is charged using power provided by the RESS.

A method is disclosed that includes comparing, via a controller, an input direct current to direct current (DC-DC) converter voltage of a DC-DC converter to a predetermined voltage threshold and selectively operating a first switch of the DC-DC converter to ramp up a voltage stored by a pre-charge capacitor, wherein the pre-charge capacitor is charged using power provided by a rechargeable energy storage system (RESS). The method also includes selectively operating a second switch of the DC-DC converter to ramp up a charger current to a predetermined charging current threshold such that the charger current recharges the RESS.

In other features, the charger current is provided by a DC charging station.

In other features, the DC charging station comprises a DC fast-charging station capable of outputting power ranging from about fifty kilowatts (50 kW) to about three hundred and fifty kilowatts (350 kW).

In other features, the first switch and the second switch comprise a voltage-controlled semiconductor switch.

In other features, the voltage-controlled semiconductor switch comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (WBG) device, or an ultra-wideband-gap device (UWBG).

In other features, the first switch and the second switch are configured to operate in complementary states of operation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
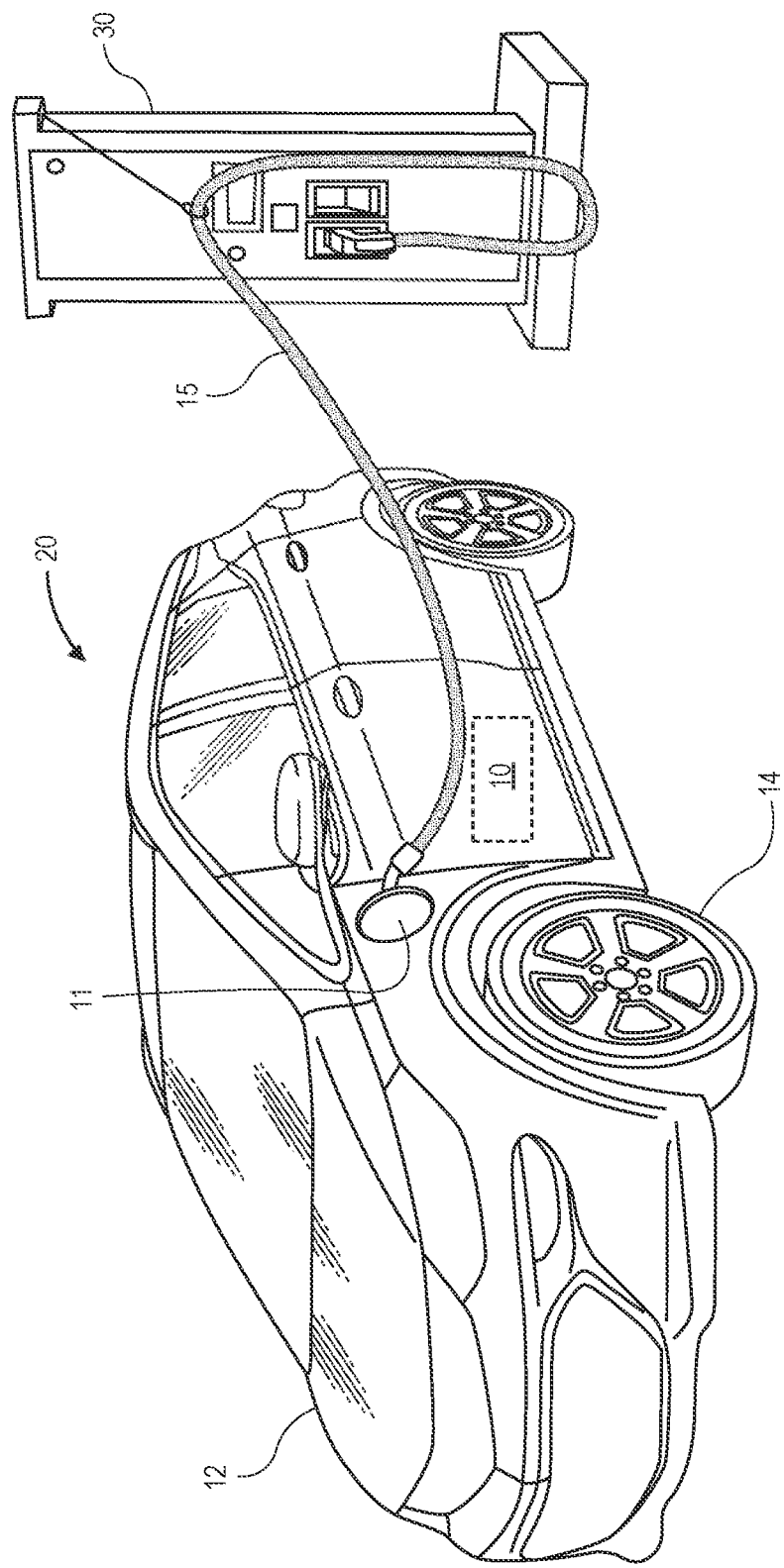
FIG. 1 is a schematic illustration of an example motor vehicle connected to an off-board DC charging station.

FIG. 1 illustrates an example direct current (DC) charging circuit 10 as part of a motor vehicle 20. The vehicle 20 is depicted as undergoing a DC fast-charging operation in which the DC charging circuit 10 is electrically connected to an off-board DC charging station 30 via a charging port 11 and a charging cable 15, e.g., using an SAE J1772 charge connector or another suitable regional or national standard charging plug or connector. The present disclosure is independent of the particular charging standard that is ultimately employed in a DC fast-charging operation involving the DC charging station 30, and thus the above-noted examples are merely illustrative. For example, the DC charging station 30 may be a DC fast-charging station capable of provisioning power to the vehicle 20 in which the power output ranges between about fifty kilowatts (50 kW) to about three hundred and fifty kilowatts (350 kw). In another possible embodiment, the vehicle 20 could be charged from a second vehicle having the ability to provide charging power to the vehicle 20.

The DC charging circuit 10 may be used as part of the motor vehicle 20, as well as other electrical systems such as stationary or mobile power plants robots or platforms. For vehicular applications, non-motor vehicles such as aircraft, marine vessels, and rail vehicles may enjoy similar benefits. The DC charging circuit 10 may be used as part of a powertrain of a mobile system, such as the example vehicle 20. For illustrative consistency, an application of the DC charging circuit 10 as an integral part of the vehicle 20 in a motor vehicle context will be described hereinafter without limiting the present disclosure to such an implementation.

Figure 2:
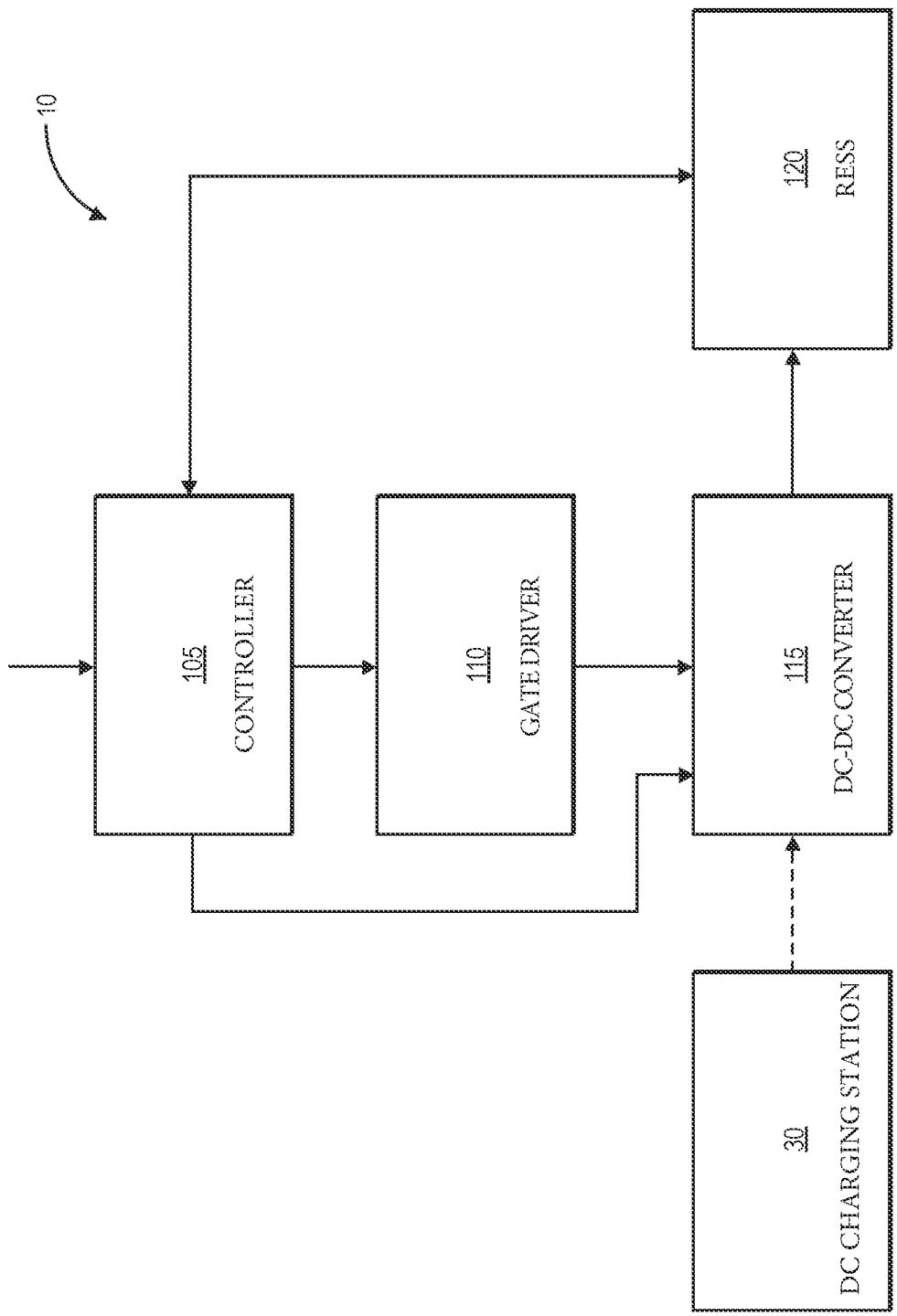
FIG. 2 is a block diagram of an example direct current (DC) charging circuit, i.e., electrical system, according to an example implementation.
Figure 3:
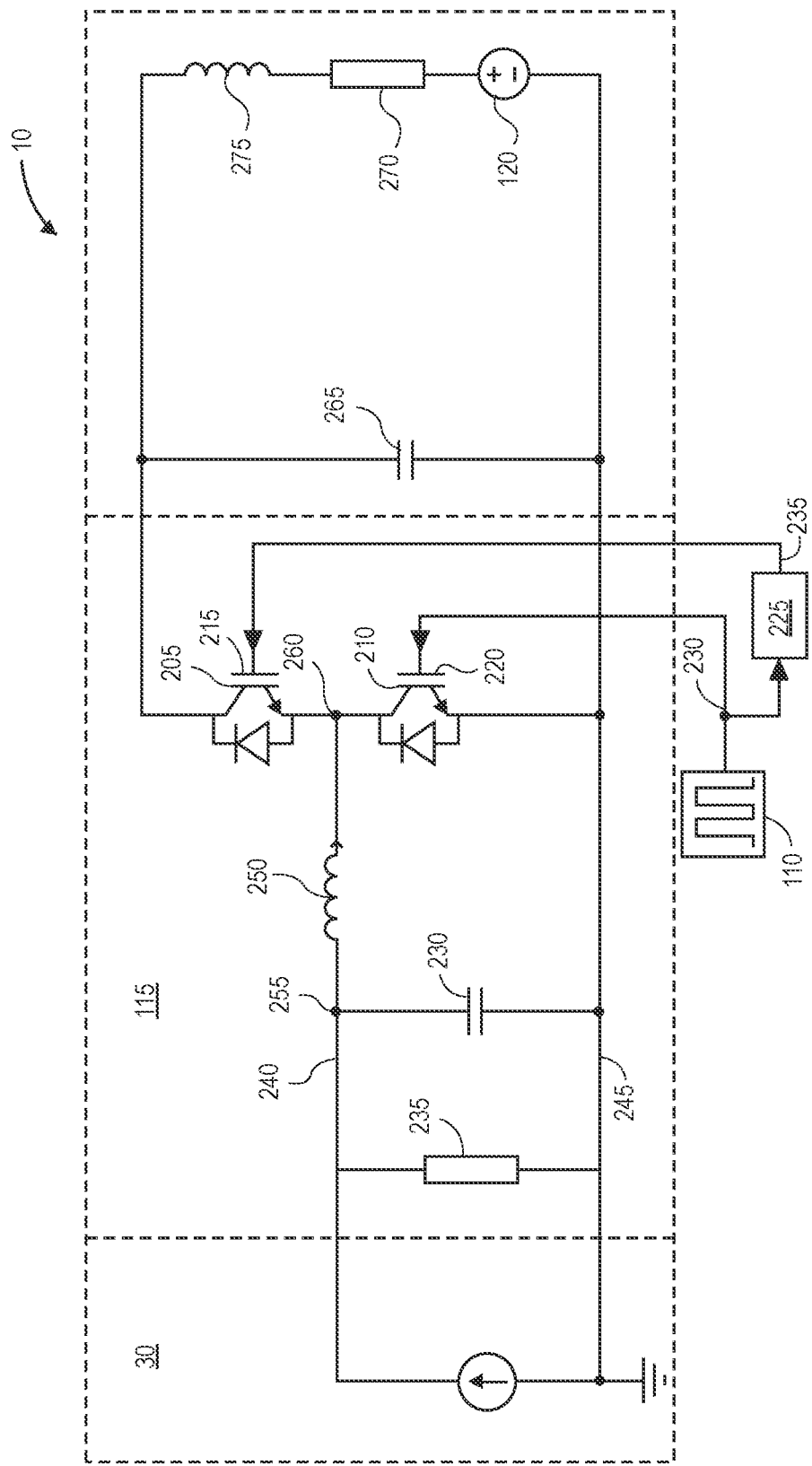
FIG. 3 is a circuit schematic of the example electrical system according to an example implementation.

The vehicle 20 of FIG. 1 includes a body 12 and drive wheels 14. The body 12 may define or include the charging port 11 at a user-accessible location. The vehicle 20 may be variously embodied as a plug-in electric vehicle having onboard rechargeable energy storage system (RESS) 120 as shown in FIGS. 2 and 3 and described below, e.g., a multi-cell lithium ion, zinc-air, nickel-metal hydride, or lead acid direct current battery pack that can be selectively recharged using the off-board DC charging station 30 of FIG. 1. During operation of the vehicle 20, the RESS 120 can provide electrical power to one or more powertrain/traction drive components of the vehicle 20, such as an electric machine (EM), e.g., a traction motor, to generate and deliver motor torque to the drive wheels 14 for propulsion of the vehicle 20, or for performing other useful work aboard the vehicle 20.

FIG. 2 illustrates a block diagrams of an DC charging circuit 10 for the vehicle 20 according to various implementations. As shown, the DC charging circuit 10 includes a controller 105 that can include at least one processor and memory for storing computer-readable instructions. The memory includes tangible, non-transitory memory, e.g., read only memory, whether optical, magnetic, flash, or otherwise.

The controller 105 also includes sufficient amounts of random-access memory, electrically erasable programmable read only memory, and the like, as well as a high-speed clock, analog-to-digital and digital-to-analog circuitry, and input/output circuitry and devices, as well as appropriate signal conditioning and buffer circuitry.

The DC charging circuit 10 also includes a gate driver 110 and a direct current to direct current (DC-DC) converter 115. The controller 105 is operatively connected to the gate driver 110 and the DC-DC converter 115. Based on the control signals issued by the controller 105, the gate driver 110 to control one or more switches within the DC-DC converter 115 as explained in greater detail below with respect to FIG. 3. In various implementations, the controller 105 can include a pulse-width-modulator that provides pulse-width-modulated signals to the gate driver 110. The gate driver 110 can operate the DC-DC converter 115 based on the signals received from the pulse-width-modulator.

As shown, the DC charging circuit 10 also includes an onboard rechargeable energy storage system (RESS) 120 adapted for storing high-voltage electrical energy used for propelling an electric-drive vehicle, such as the vehicle 20 of FIG. 1.

The RESS 120 may be a deep-cycle, high-ampere capacity battery system rated for approximately four hundred (400) to approximately eight hundred (800) volts direct current (VDC) or more, for example, depending on a desired vehicle range, gross vehicle weight, and power ratings of the various loads drawing electrical power from the RESS 120 in various implementations. However, it is understood that the RESS 120 may be rated for other voltages as well. The RESS 120 may include one or more high-voltage, independently rechargeable battery packs.

When the DC charging station 30 is connected to the vehicle 20, e.g., the charging cable 15 of the DC charging station 30 is connected to the charging port 11 of the vehicle 20, the DC charging station 30 delivers electrical energy to the DC-DC converter 115 to charge the RESS 120.

FIG. 3 illustrates a circuit schematic of the DC charging circuit 10 according to an example implementation of the present disclosure. As shown, the DC-DC converter 115 can include a first switch 205 and a second switch 210. In an example implementation, the switches 205, 210 comprise voltage-controlled semiconductor switches that are controlled by control signals provided by the controller 105 through the gate driver 110. In various implementations, the switches 205, 210 comprise a voltage-controlled switching device in the form of a silicon insulated gate bipolar transistor (IGBT), a silicon carbide (SiC) metal-oxide semiconductor field effect transistor (MOSFET), a silicon (Si) super-junction MOSFET, a Gallium nitride (GaN) field-effect transistor (FET), a SiC junction-gate field-effect transistor (JFET), other wideband-gap (WBG) or ultra-wideband-gap semiconductor power switching device (UWBG), or other suitable switch having a corresponding gate to which a gate signal is applied to change the on/off state of a given switch.

As shown in FIG. 3, the gate driver 110 is operatively connected to gates 215, 220 of the switches 205, 210 and provide gate signals to the corresponding gates to control whether the corresponding switch 205, 210 is operating in an open state to prevent current flow or a closed state to allow current flow. The gate driver 110 can include an inverter 225 that inverts the gate signal provided by the gate driver 110. For example, an output 230 of the gate driver 110 is connected to the gate 220 of the second switch 210, and an output 235 of the inverter 225 is connected to the gate 215 of the switch 205. Based on this configuration, the switches 205, 210 operate in a complementary state in which when one of the switches 205, 210 is in the closed state, the other one of the switches 205, 210 is operating in the open state.

The DC charging circuit 10 can also include a pre-charge capacitor 230 and a discharge resistor 235 that are connected in parallel. The pre-charge capacitor 230 and the discharge resistor 235 are connected between positive terminal 240 and negative terminal 245.

The DC charging circuit 10 also includes an inductor 250 between node 255 and node 260. The node 255 comprises an electrical node for which positive terminals of the pre-charge capacitor 230 and the discharge resistor 235 are connected. The node 260 comprises an electrical node that can serve as input to the switches 205, 210. For example, depending on the operation of the DC charging circuit 10, electrical energy can be passed via the inductor 250 to one of the switches 205, 210. The DC charging circuit 10 can also include an output capacitor 265. The pre-charge capacitor 230, the discharge resistor 235, the inductor 250, and the output capacitor 265 may comprise any suitable values in accordance with the present disclosure.

When the DC charging station 30 is connected to the DC charging circuit 10, the DC charging station 30 functions as a current source to the DC-DC converter 115. As discussed in greater detail herein, a boost mode technique may be used to provide sufficient electrical energy to the RESS 120 for charging purposes. For example, the boost mode technique can be used to account for an internal resistance 270 and an internal inductance 275 associated with the RESS 120.

Figure 4:
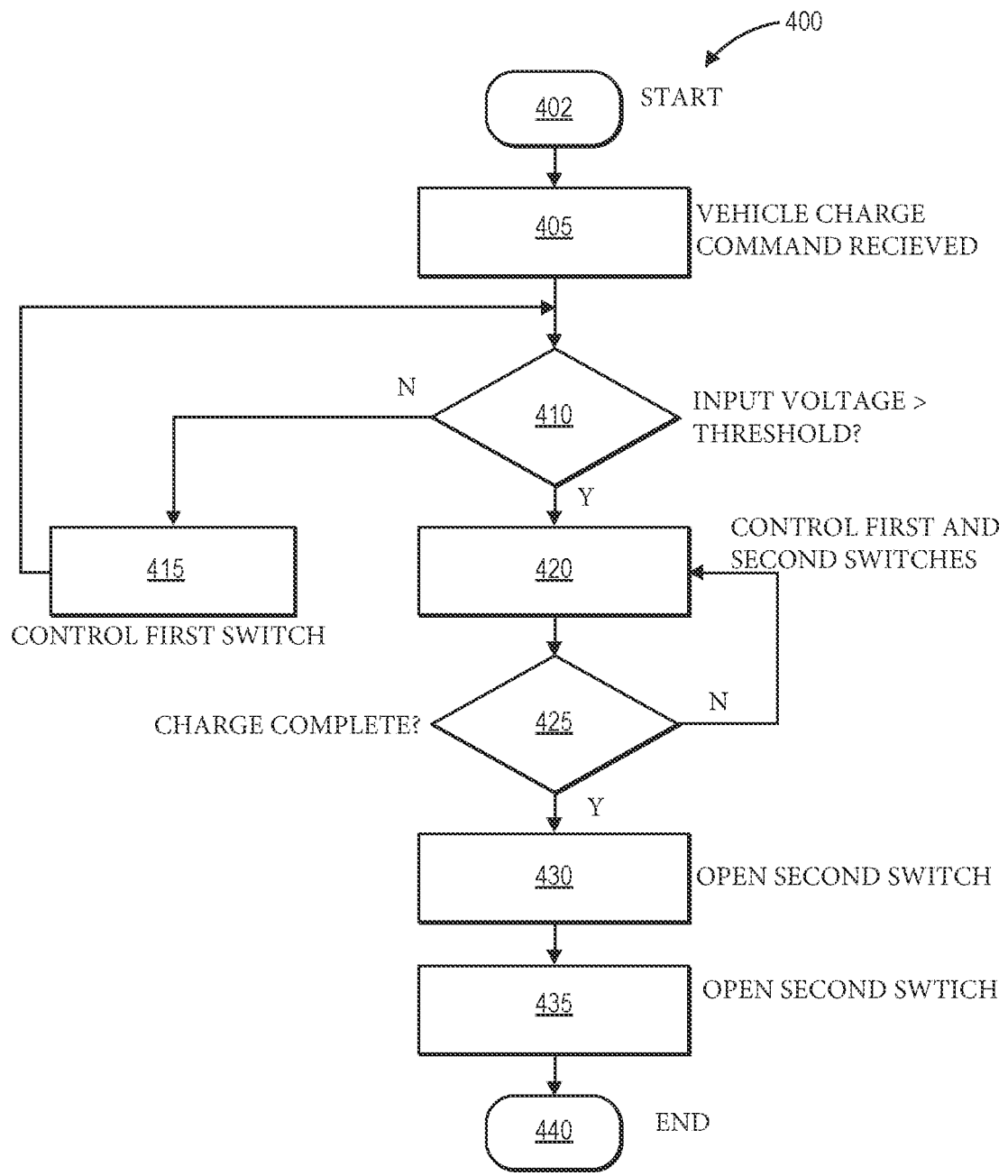
FIG. 4 is a flow chart illustrating an example process for charging a RESS of a vehicle via an off-board power source according to an example implementation.

FIG. 4 is a flowchart of an exemplary process 400 for selectively recharging the RESS 120 via an off-board power source, such as the DC charging station 30, that functions as a current source, whose maximum voltage is lower than that of the RESS 120. Blocks of the process 400 can be executed by the controller 105. The process 400 begins at block 402. At block 405, a vehicle charging command is received at the controller 105. For example, the vehicle charging command may be provided to the controller 105 when a connector of the charging cable 15 is interfaced with the charging port 11.

At block 410, a determination is made whether an input DC-DC converter voltage is greater than or equal to a predetermined voltage threshold. The controller 105 can determine whether the input DC-DC converter voltage is greater than or equal to the predetermined voltage threshold using one or more sensors (not shown) deployed within the DC charging circuit 10. For example, the one or more sensors may comprise voltage sensors that determine a voltage value at one or more nodes within the DC charging circuit 10. In some implementations, the input DC-DC converter voltage may comprise the voltage stored by the pre-charge capacitor 230.

If the input DC-DC converter voltage is less than the predetermined voltage threshold, the controller 105 causes the gate driver 110 to generate control signals that control operation of the switch 205 at block 415. For example, the gate driver 110 can transmit control signals such that a buck mode duty cycle is applied to the gate 215 causes the DC-DC converter 115 to operate in a buck mode of operation causing voltage stored by the pre-charge capacitor 230 to ramp to the predetermined voltage threshold. During the buck mode of operation, the pre-charge capacitor 230 is charged to the predetermined voltage threshold via power provided by the RESS 120.

When the input DC-DC converter voltage is greater than or equal to the predetermined voltage threshold, the controller 105 causes the gate driver 110 to output control signals to the switches 205, 210 according to a boost mode duty cycle at block 420 to ramp up a charging current to a predetermined charging current threshold. In an example implementation, the predetermined charging current threshold may be about one hundred and twenty-five amperes (125 A). However, it is understood that other predetermined charging current thresholds can be selected based on a recharging operation. In various implementations, the switch 210 (as well as the switch 205 based on the complementary nature of the switches 205, 210) of the DC-DC converter 115 is controlled via the control signals applied to the gate 220 to control a charging current that is provided to the RESS 120. The boost mode duty cycle can control an amplitude of the charging current such that the charging current ramps up to the predetermined charging current threshold. The charging current can be supplied from the DC charging station 30 to the RESS 120 via the switch 205. In some instances, the controller 105 causes the gate driver 110 to output control signals with a dead time between the complementary signals applied to the gates of 215 and 220 to mitigate current shoot-through via switches 205 and 210.

At block 425, a determination is made whether the charging operation is complete. For example, the controller 105 can compare a voltage stored by the RESS 120 to a RESS voltage threshold. If the voltage stored by the RESS 120 is greater than or equal to the RESS voltage threshold, the charging operation is complete. If the charging operation is not complete, the process 400 returns to block 420.

Otherwise, the controller 105 causes the charging current to ramp down by causing the switch 210 to operate in the open state at block 430. At block 435, the controller 105 causes both switches 205, 210 to transition to the open state, and the voltage stored by the pre-charge capacitor 230 is discharged via the discharge resistor 235. The process 400 then ends at block 440.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electrical system that increases a voltage supplied by a DC charging station, comprising:
    a rechargeable energy storage system (RESS); and
    a direct current to direct current (DC-DC) converter connected to the RESS and configured to connect to the DC charging station, wherein the DC-DC converter is configured to selectively connect the RESS to the DC charging station such that a charging current is selectively provided to the RESS during a recharging operation, wherein the DC-DC converter includes:
        a positive terminal;
        a negative terminal connected to the RESS;
        a pre-charge capacitor connected between the positive terminal and the negative terminal;
        an input node on the positive terminal;
        a first switch connected between the input node and the negative terminal; and
        a second switch connected between the input node and the RESS,
    wherein when an input DC-DC converter voltage is less than a predetermined voltage threshold, the second switch is controlled to cause a voltage stored by the pre-charge capacitor to ramp to the predetermined voltage threshold, and wherein when the input DC-DC converter voltage is greater than or equal to the predetermined voltage threshold, the first switch and the second switch are controlled to ramp up a charging current to a predetermined charging current threshold to the RESS.

2. The electrical system of claim 1, wherein the DC-DC converter further comprises an inductor disposed between a point on the positive terminal where the pre-charge capacitor is connected and the input node.

3. The electrical system of claim 2, wherein the first switch and the second switch comprise a voltage-controlled semiconductor switch.

4. The electrical system of claim 3, wherein the voltage-controlled semiconductor switch comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (WBG) device, or an ultra-wideband-gap device (UWBG).

5. The electrical system of claim 2, wherein the first switch and the second switch are configured to operate in complementary states of operation.

6. The electrical system of claim 2, further comprising:
a controller operatively connected to the DC-DC converter and is configured to operate the DC-DC converter to selectively connect the RESS to the DC charging station based on a gate signal provided to at least one of the first switch or the second switch.

7. The electrical system of claim 6, further comprising an output capacitor connected between positive and negative terminals of the RESS.

8. A vehicle including an electrical system that increases a voltage supplied by a DC charging station, the electrical system comprising:
a rechargeable energy storage system (RESS); and
a direct current to direct current (DC-DC) converter connected to the RESS and configured to connect to the DC charging station, wherein the DC-DC converter is configured to selectively connect the RESS to the DC charging station such that a charging current is selectively provided to the RESS during a recharging operation, wherein the DC-DC converter includes:
a positive terminal;
a negative terminal connected to the RESS;
a pre-charge capacitor connected between the positive terminal and the negative terminal;
an input node on the positive terminal;
a first switch connected between the input node and the negative terminal; and
a second switch connected between the input node and the RESS,
wherein when an input DC-DC converter voltage is less than a predetermined voltage threshold, the second switch is controlled to cause a voltage stored by the pre-charge capacitor to ramp to the predetermined voltage threshold, and wherein when the input DC-DC converter voltage is greater than or equal to the predetermined voltage threshold, the first switch and the second switch are controlled to ramp up a charging current to a predetermined charging current threshold to the RESS.

9. The vehicle of claim 8, wherein the DC-DC converter further comprises an inductor disposed between a point on the positive terminal where the pre-charge capacitor is connected and the input node.

10. The vehicle of claim 9, wherein the first switch and the second switch comprise a voltage-controlled semiconductor switch.

11. The vehicle of claim 10, wherein the voltage-controlled semiconductor switch comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (FET), a wideband-gap (WBG) device, or an ultra-wideband-gap device (UWBG).

12. The vehicle of claim 10, further comprising:
a controller operatively connected to the DC-DC converter and is configured to operate the DC-DC converter to selectively connect the RESS to the DC charging station based on a gate signal provided to at least one of the first switch or the second switch.

13. The vehicle of claim 12, further comprising an output capacitor connected between positive and negative terminals of the RESS.

14. The vehicle of claim 9, wherein the first switch and the second switch are configured to operate in complementary states of operation.

15. A method comprising:
comparing, via a controller, an input direct current to direct current (DC-DC) converter voltage of a DC-DC converter to a predetermined voltage threshold, wherein the DC-DC converter includes a positive terminal, a negative terminal connected to a rechargeable energy storage system (RESS), a pre-charge capacitor connected between the positive terminal and the negative terminal, an input node on the positive terminal, a first switch connected between the input node and the negative terminal, and a second switch connected between the input node and the RESS;
selectively operating the first switch of the DC-DC converter to ramp up a voltage stored by a pre-charge capacitor, wherein the pre-charge capacitor is charged using power provided by the RESS; and
selectively operating the second switch of the DC-DC converter to ramp up a charger current to a predetermined charging current threshold such that the charger current recharges the RESS.

16. The method of claim 15, wherein the charger current is provided by a DC charging station.

17. The method of claim 16, wherein the DC charging station comprises a DC fast-charging station capable of outputting power ranging from about fifty kilowatts (50 kW) to about three hundred and fifty kilowatts (350 kW).

18. The method of claim 15, wherein the first switch and the second switch comprise a voltage-controlled semiconductor switch.

19. The method of claim 18, wherein the voltage-controlled semiconductor switch comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (FET), a wideband-gap (WBG) device, or an ultra-wideband-gap device (UWBG).

20. The method as recited in claim 15, wherein the first switch and the second switch are configured to operate in complementary states of operation.

* * * * *